US012055877B2

(12) United States Patent
Matsuura et al.

(10) Patent No.: US 12,055,877 B2
(45) Date of Patent: Aug. 6, 2024

(54) FIXING APPARATUS

(71) Applicant: CANON KABUSHIKI KAISHA, Tokyo (JP)

(72) Inventors: Daigo Matsuura, Tokyo (JP); Hiroki Kawai, Chiba (JP); Ayano Ogata, Ibaraki (JP); Yasuharu Toratani, Chiba (JP); Misa Kawashima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/184,578

(22) Filed: Mar. 15, 2023

(65) Prior Publication Data

US 2023/0393503 A1 Dec. 7, 2023

(30) Foreign Application Priority Data

Mar. 22, 2022 (JP) ................................ 2022-045079
May 17, 2022 (JP) ................................ 2022-080694

(51) Int. Cl.
*G03G 15/20* (2006.01)

(52) U.S. Cl.
CPC ....... *G03G 15/205* (2013.01); *G03G 15/2064* (2013.01); *G03G 2215/2045* (2013.01)

(58) Field of Classification Search
None
See application file for complete search history.

(56) References Cited

U.S. PATENT DOCUMENTS

2005/0117924 A1* 6/2005 Okano ............... G03G 15/2046 399/45
2023/0314988 A1* 10/2023 Seki .................. G03G 15/2039 399/68

FOREIGN PATENT DOCUMENTS

JP 2008085948 A * 4/2008
JP 2008116729 A * 5/2008
JP 2011242598 A 12/2011
JP 2012138896 A 7/2012
JP 2015045849 A * 3/2015 ......... G03G 9/08755
JP 2016161772 A * 9/2016
JP 6176981 B2 * 8/2017 ......... G03G 15/2017
JP 2020008621 A * 1/2020

* cited by examiner

*Primary Examiner* — Sevan A Aydin
(74) *Attorney, Agent, or Firm* — Canon U.S.A., Inc. IP Division

(57) ABSTRACT

A fixing apparatus includes a heating rotary member and a pressing rotary member, which form a nip portion, at which a toner image is fixed to a recording material, a mixture job is a job with a mixture of recording materials including a recording material with a first grammage and a recording material with a second grammage greater than the first grammage, one of a plurality of modes is performable in the mixture job, in which a maximum value of an amount of toner on the recording material with the first grammage is greater than a maximum value of the amount of toner on the recording material with the second grammage in the first mode whereas the maximum value on the recording material with the first grammage is equal to the maximum value on the recording material with the second grammage in the second mode.

13 Claims, 8 Drawing Sheets

FIXING APPARATUS

BACKGROUND

Field of the Disclosure

The present disclosure relates to a fixing apparatus that fixes a toner image to a recording material.

Description of the Related Art

An image forming apparatus includes a fixing apparatus that fixes an unfixed toner image on a recording material thereto.

A known configuration of the fixing apparatus includes a heating rotary member including a heating source for heating unfixed toner images and a pressing roller that presses the heating rotary member (Patent No. 2011-242598). Further, the fixing apparatus includes a contact/separation mechanism that is movable between the position where the contact/separation mechanism brings the pressing rotary member into contact with the heating rotary member and the position where the contact/separation mechanism separates the pressing rotary member from the heating rotary member. With the pressing rotary member in contact with the heating rotary member, the heating rotary member and the pressing rotary member form a nip portion. When a recording material bearing an unfixed toner image is conveyed into the nip portion, heat and pressure for fixing are applied to the recording material at the nip portion, fixing the toner to the recording material.

The amount of heat to fix a toner image formed on a recording material to the recording material varies depending on the type of the recording material. Japanese Patent Application Laid Open No. 2011-242598 discusses a technique for changing the temperature for a heating rotary member based on the type of the recording material. This technique controls the amount of heat applied to the toner image on the recording material appropriately.

There is also a known technique for changing a fixing temperature based on the amount of toner on a recording material, as well as the type of the recording material (Japanese Patent Application Laid Open No. 2012-138896). With a greater amount of toner, a greater amount of heat for melting the toner is applied.

Changing the amount of heat to an appropriate amount based on the type of the recording material and the amount of toner improves the quality of the toner image formed on the recording material. Meanwhile, changing the temperature for each recording material reduces productivity. Thus, a fixing apparatus including an image quality priority mode and a productivity priority mode allows a user to select a mode in fixing based on an intended use.

A fixing apparatus including a plurality of modes changes the temperature of a heating rotary member based on the type of a recording material that is a fixing target.

The fixing material in fixing in a job with a mixture of recording materials with different grammages changes the temperature of the heating rotary member each time the type of the recording material is changed, which can reduce the productivity.

SUMMARY

The present disclosure is generally directed to a fixing apparatus that prevents decrease in productivity in fixing in a job with a mixture of recording materials with different grammages.

According to an aspect of the present disclosure, an image forming apparatus includes a heating rotary member configured to apply heat to a recording material, a pressing rotary member configured to press the heating rotary member, the pressing rotary member and the heating rotary member forming a nip portion, at which heat and pressure is applied to the recording material, and a toner image is fixed to the recording material, a control unit configured to control a maximum value for an amount of toner on the recording material, and an acquisition unit configured to acquire grammage information of the recording material that is a target of the fixing. A mixture job is a job with a mixture of a plurality of recording materials including a recording material with a first grammage and a recording material with a second grammage greater than the first grammage. One of a plurality of modes including a first mode and a second mode is performable in the mixture job. In a case where the mixture job is to be performed in the first mode, the maximum value on the recording material with the second grammage is smaller than the maximum value on the recording material with the first grammage. A fixing temperature for the recording material with the first grammage is equal to a fixing temperature for the recording material with the second grammage. In a case where the mixture job is to be performed in the second mode, the maximum value on the recording material with the first grammage is equal to the maximum value on the recording material with the second grammage. The maximum value on the recording material with the second grammage is greater in the second mode than in the first mode. The fixing temperature for the recording material with the first grammage is lower than the fixing temperature for the recording material with the second grammage.

Further features of the present disclosure will become apparent from the following description of embodiments with reference to the attached drawings.

DESCRIPTION OF THE EMBODIMENTS

An image forming apparatus according to embodiments of the present disclosure will be described below with reference to the drawings. An example will be described in which the embodiments of the present disclosure are applied to an electrophotographic full-color image forming apparatus including a plurality of photosensitive drums, but embodiments of the present disclosure are not limited to the example. The embodiments of the present disclosure are applicable to image forming apparatuses of various other systems and single-color image forming apparatuses.

<Image Forming Apparatus>

Figure 1:
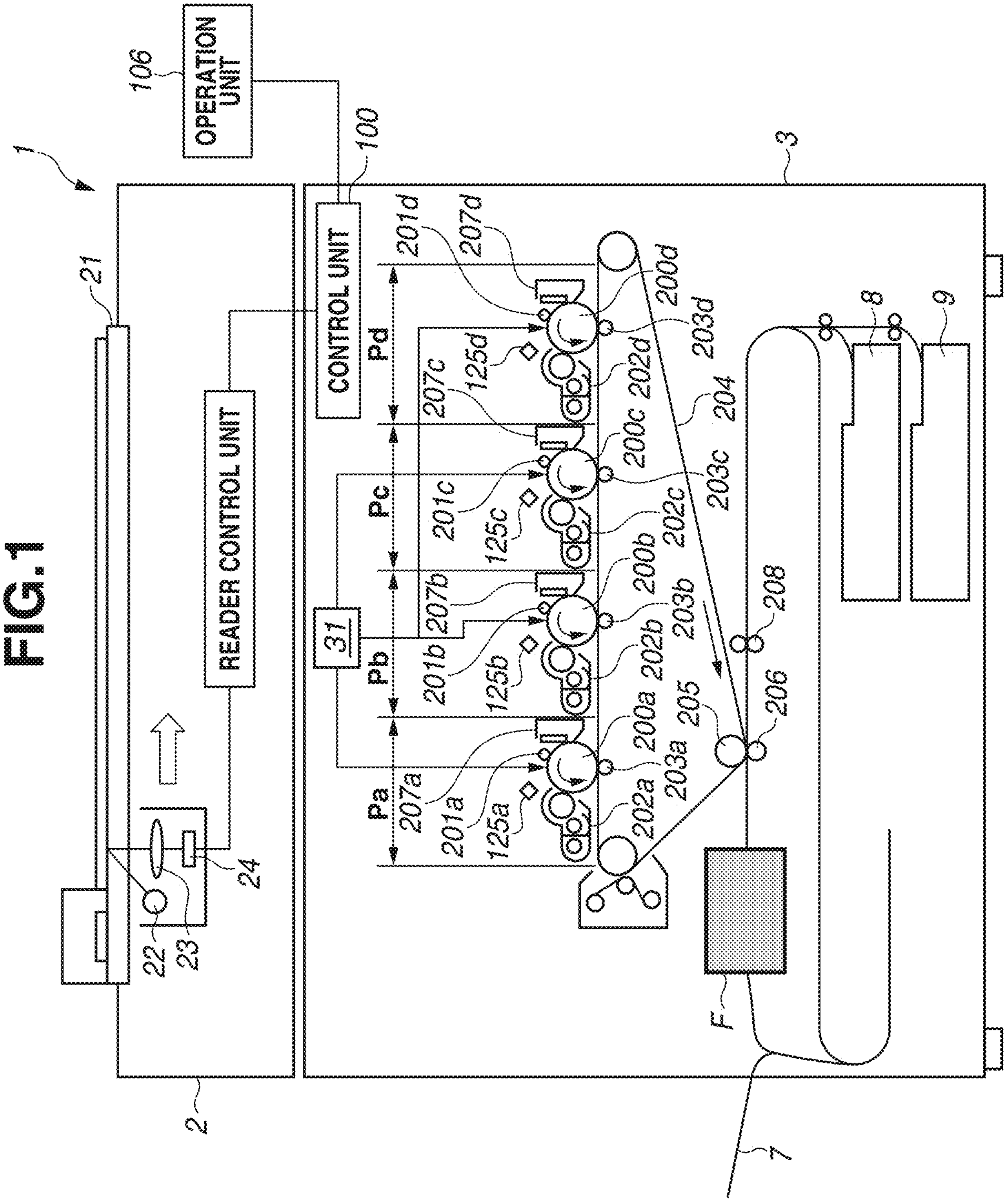
FIG. 1 is a schematic diagram illustrating a cross section of an image forming apparatus.

FIG. 1 illustrates a full-color image forming apparatus according to a first embodiment. An image forming apparatus 1 includes an image reading unit 2 and an image forming apparatus body 3. The image reading unit 2 reads a document placed on a platen glass 21. Light emitted from a light source 22 is reflected from the document and forms an image on a charge-coupled device (CCD) sensor 24 via an optical system member 23 such as a lens. This optical system unit scans the document in the arrow direction and thereby converts the document into an electric signal data sequence for each line. Image signals acquired by the CCD sensor 24 are transmitted to the image forming apparatus body 3, and a control unit 100 performs image processing on the image signals for each image forming unit described below. Further, the control unit 100 receives external inputs as image signals from external host apparatuses such as a print server.

The image forming apparatus body 3 includes a plurality of image forming units Pa, Pb, Pc, and Pd, and the image forming units Pa, Pb, Pc, and Pd form images based on the image signals. Specifically, the image signals are converted into a pulse-width modulated (PWM) laser beam by the control unit 100. In FIG. 1, a polygon scanner 31 is an exposure apparatus and emits a laser beam corresponding to each image signal. The laser beams strikes photosensitive drums 200*a* to 200*d* as image bearing members of the image forming units Pa to Pd.

The image forming units Pa, Pb, Pc, and Pd respectively correspond yellow (Y), magenta (M), cyan (C), and black (Bk) image forming units, which form yellow, magenta, cyan, and black images, respectively. The image forming units Pa to Pd are substantially identical to one another, so that the image forming unit Pa corresponding to Y will be described in detail, and the description of the other image forming units will be omitted. In the image forming unit Pa corresponding to Y, a toner image is formed on the surface of the photosensitive drum 200*a* based on image signals, which will be described.

A primary charging device 201*a* charges the surface of the photosensitive drum 200*a* to a predetermined potential to prepare for electrostatic latent image forming. Laser beams from the polygon scanner 31 form an electrostatic latent image on the surface of the photosensitive drum 200*a* charged to the predetermined potential. A development device 202*a* develops the electrostatic latent image on the photosensitive drum 200*a* and forms a toner image. A transfer roller 203*a* performs discharging from the back side of an intermediate transfer belt 204, applies a primary transfer bias opposite in polarity to the toner, and transfers the toner image on the photosensitive drum 200*a* to the intermediate transfer belt 204. After the transfer, the surface of the photosensitive drum 200*a* is cleaned by a cleaner 207*a*.

Further, the toner image on the intermediate transfer belt 204 is conveyed to the next image forming unit. Y, M, C, and Bk toner images respectively formed in the image forming units Pa, Pb, Pc, and Pd are sequentially transferred in this order to the intermediate transfer belt 204, thereby forming a four-color image on the surface of the intermediate transfer belt 204. After the full-color toner image passes through the image forming unit Pd corresponding to Bk, a secondary transfer electric field opposite in polarity to the full-color toner image on the intermediate transfer belt 204 is applied to the full-color toner image at a secondary transfer portion formed by a pair of secondary transfer rollers 205 and 206, and the full-color toner image is secondarily transferred to a sheet P (recording material P). After a fed sheet is kept at a registration portion 208, a timing is controlled to align the full-color toner image on the intermediate transfer belt 204 with the sheet, and the sheet is conveyed from the registration portion 208. Thereafter, the toner image on the sheet are fixed to the sheet by a fixing apparatus F as an image heating apparatus. After passing through the fixing apparatus F, the sheet is discharged from the image forming apparatus 1. In a duplex print job, after the transfer and fixing of the toner to a first image forming surface (first surface) of the sheet is completed, the sheet is reversed through a reversing portion in the image forming apparatus 1. Thereafter, the transfer and fixing of toner to the second image forming surface (second surface) of the sheet is performed, and then the sheet is discharged from the image forming apparatus 1 and stacked on a sheet discharge tray 7.

The process from the charging to the discharging of the sheet P with the toner image fixed thereto to the sheet discharge tray 7 will be referred to as an image forming process (print job). Further, a period during which the image forming is performed will be referred to as "during the image forming process" (during the print job).

Next, a configuration of the fixing apparatus F according to the present embodiment will be described with reference to FIG. 2.

<Fixing Apparatus>

Figure 2:
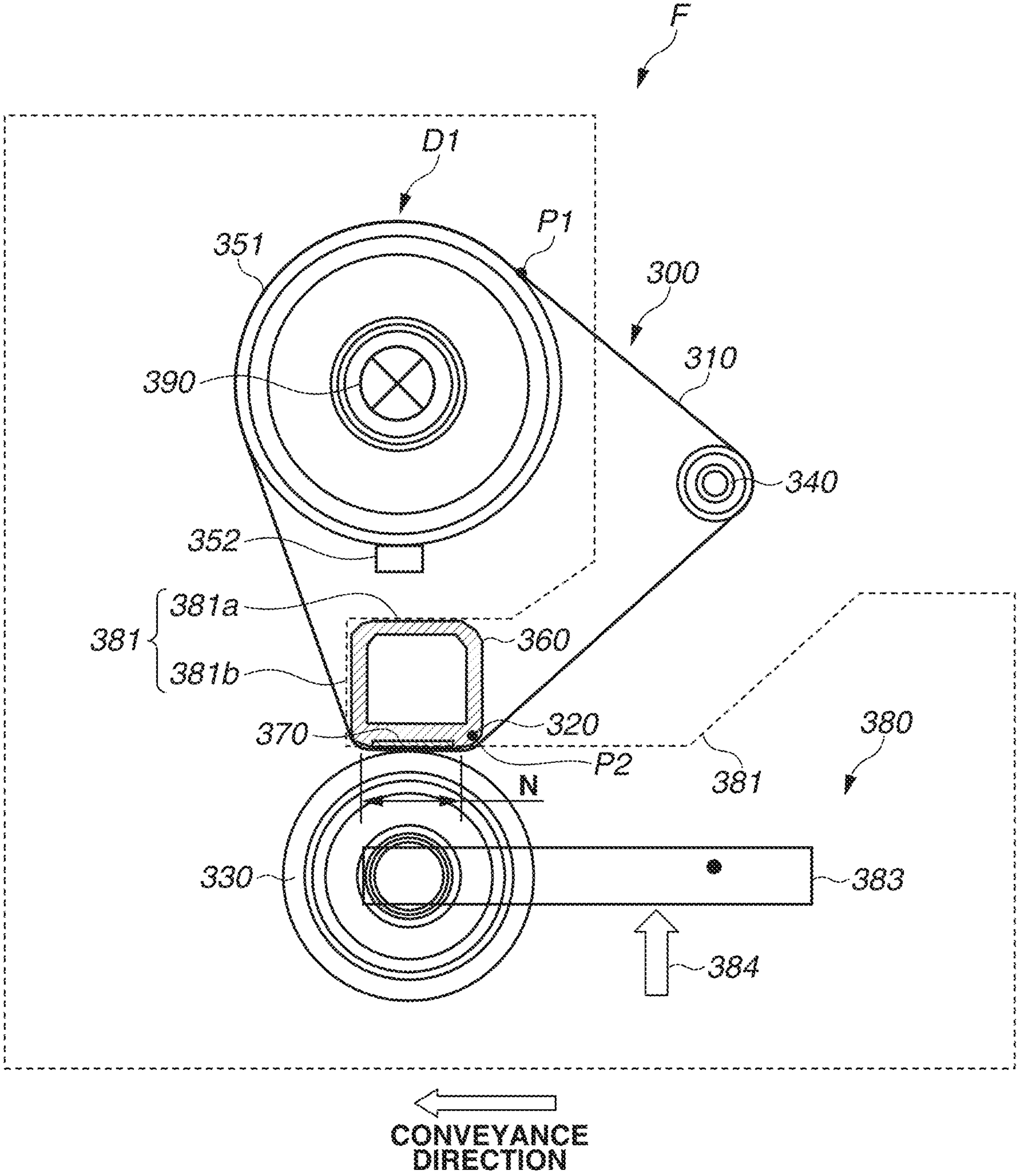
FIG. 2 is a schematic diagram illustrating a cross section of a fixing apparatus.

FIG. 2 is a schematic diagram illustrating the overall configuration of the fixing apparatus F of a belt heating type according to the present embodiment. In FIG. 2, the recording material P is conveyed from right to left. The fixing apparatus F includes a heating unit 300, and the heating unit 300 includes a fixing belt (hereinafter, "belt") 310 as an endless, rotatable heating rotary member, a pressing pad (hereinafter, "pad") 320 as a fixing member, a heating roller 351, and a steering roller 340. The heating unit 300 further includes a pressing roller 330 as a pressing rotary member facing the belt 310. The pressing roller 330 and the belt 310 form a nip portion N.

The belt 310 is thermally conductive and resistant and has a thin cylindrical shape with an inner diameter of 120 mm. According to the present embodiment, the belt 310 has a three-layer structure including a base layer, an elastic layer around the outer periphery of the base layer, and a mold release layer around the outer periphery of the elastic layer. The base layer has a thickness of 60 μm and is a polyimide resin (PI) as its material. The elastic layer has a thickness of 30 μm and is a silicone rubber as its material. The mold release layer has a thickness of 30 μm and is an ethylene tetrafluoride-perfluoroalkoxyethylene copolymer resin (PFA) as a fluorine resin as its material. Further, the belt 310 is stretched by the pad 320, the heating roller 351, and the steering roller 340.

The pad 320 is pressed against the pressing roller 330 via the belt 310. The pad 320 is a liquid crystal polymer (LCP) resin as its material. A slide sheet 370 is provided between the pad 320 and the belt 310. The slide sheet 370 is a polyimide (PI) sheet coated with polytetrafluoroethylene (PTFE) and has a thickness of 100 μm. The PI sheet has 100-μm projections at 1-mm intervals to reduce the area in contact with the belt 310, thereby reducing the slide resistance. A lubricant agent is applied to the inner surface of the belt 310, allowing the belt 310 to slide smoothly on the pad 320. A silicone oil with a viscosity of 100 cSt is used as the lubricant agent. As described above, the slide sheet 370 and the lubricant agent are used to prevent the inner periphery of the belt 310 from being worn.

While the use of the pad 320 as a member for forming the nip portion N is described above, the present embodiment is not limited to that described above. For example, the heating rotary member can have a roller shape without the use of the belt 310.

The heating roller 351 is a hollow roller with a stainless-steel core metal, and a halogen heater 390 is disposed inside the core metal. The halogen heater 390 can generate heat up to a predetermined temperature. The belt 310 is heated by the halogen heater 390 through the heating roller 351. The halogen heater 390 is controlled based on the temperature detected by a thermistor 352 to cause the surface temperature of the belt 310 to be a predetermined target temperature for the sheet type. The thermistor 352 is arranged in contact with the heating roller 351 and detects the surface temperature of the heating roller 351. While the thermistor 352 according to the present embodiment is disposed to detect the surface temperature of the heating roller 351, the present embodiment is not limited to that described above. For example, the thermistor 352 can be disposed to detect the surface temperature of the belt 310.

Further, a gear is fixed to one end portion of the shaft of the heating roller 351, and the heating roller 351 is connected to a driving source M1 of a driving roller via the gear, to be rotated. The rotation of the heating roller 351 provides a conveyance force to the belt 310.

The pressing roller 330 is a roller including a shaft, an elastic layer around the outer periphery of the shaft, and a mold release layer around the outer periphery of the elastic layer. The shaft is stainless-steel. The elastic layer has a thickness of 5 mm and is a conductive silicone rubber. The mold release layer has a thickness of 50 μm and is an ethylene tetrafluoride-perfluoroalkoxyethylene copolymer resin (PFA) as a fluorine resin. The shaft of the pressing roller 330 is supported by a fixing frame 380 of the fixing apparatus F, and a gear is fixed to one end portion of the pressing roller 330. The pressing roller 330 is connected to a pressing roller driving source M0 via the gear, to be rotated.

According to the present embodiment, the heating roller 351 is connected to the driving source M1 to be rotated by the driving source M1. Further, the pressing roller 330 is connected to the driving source M0 to be rotated by the driving source M0. Thus, the heating roller 351 and the pressing roller 330 each receive a driving force from a different driving source from each other. The present embodiment, however, is not limited to that described above. The heating roller 351 and the pressing roller 330 can each receive a driving force from the same driving source. Units for providing a driving force to the heating roller 351 and the pressing roller 330 as well as driving transmission units other than the gears are not limited to any specific units.

Heat and pressure are applied to the recording material P bearing a toner image at the nip portion N formed between the belt 310 and the pressing roller 330. As described above, the fixing apparatus F fixes the toner image to the recording material P while holding and conveying the recording material P.

The fixing frame 380 includes a heating unit positioning unit 381, a pressing frame 383, and a pressing spring 384. A stay 360 of the heating unit 300 is inserted in the heating unit positioning unit 381, and the stay 360 is fixed to the heating unit positioning unit 381 by a securing unit (not illustrated).

After the stay 360 is fixed, the pressing frame 383 is moved by a driving source (not illustrated) and a cam, thereby pressing the pressing roller 330 against the pad 320 via the belt 310.

The heating unit positioning unit 381 includes a pressing direction regulation surface 381*a* and a conveyance direction regulation surface 381*b*. The pressing direction regulation surface 381*a* is opposed to the pressing roller 330, and the conveyance direction regulation surface 381*b* is a contact surface in the insertion direction of the heating unit 300.

The printing speed is set at 630 mm/s. The pressing force in the fixing nip is set at 1000 N. The target regulation temperature of the belt 310 during printing is set at about 160° C. to about 200° C.

The steering roller 340 for keeping the conveyance orientation of the belt 310 is disposed upstream of the nip portion N. The steering roller 340 is biased by a spring supported by a frame of the heating unit 300 and is driven with respect to the belt 310 by a tension roller applying a predetermined tensile force to the belt 310. The spring has a tension of 50 N and applies the tension to the belt 310 from the inside of the belt 310.

<Block Diagram>

Figure 3:
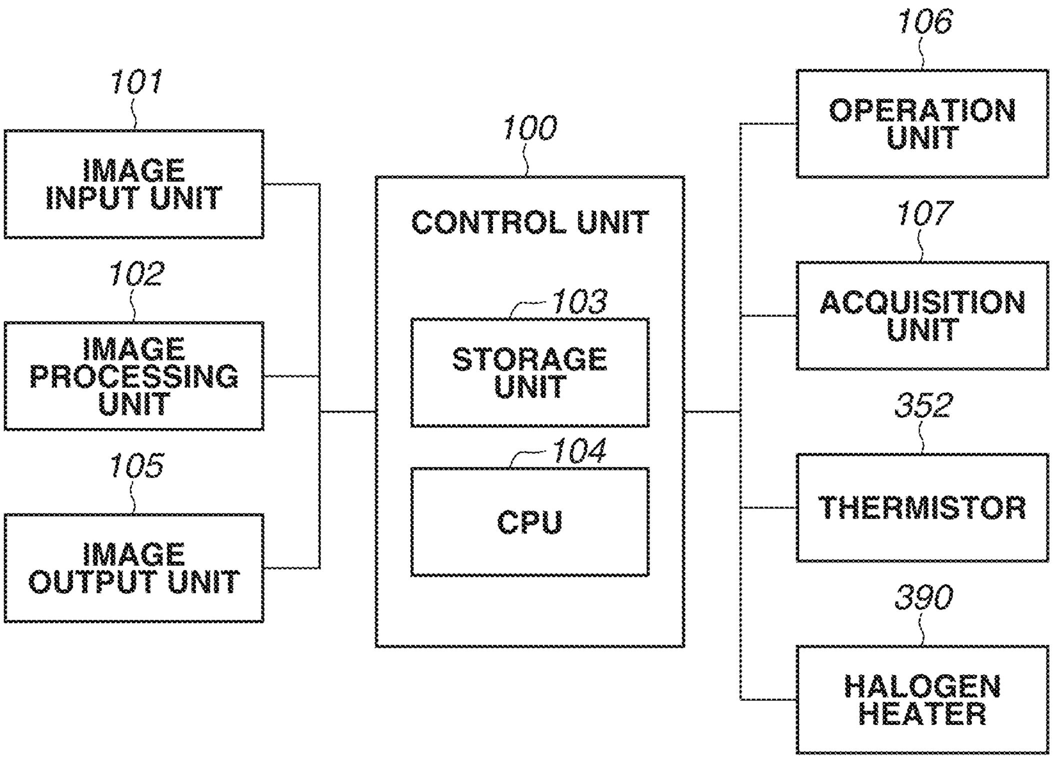
FIG. 3 is a block diagram according to a first embodiment of the present disclosure.

FIG. 3 is a block diagram illustrating an example of the configuration of the electrophotographic image forming apparatus 1 according to the present embodiment. As illustrated in FIG. 3, the image forming apparatus 1 includes an image input unit 101, an image processing unit 102, a storage unit 103, a central processing unit (CPU) 104, and an image output unit 105. The image forming apparatus 1 according to the present embodiment is connectable to external apparatuses, such as a server that manages image data and a personal computer (PC) that issues instructions to perform printing, via a network. Further, an apparatus that includes the image processing unit 102, the storage unit 103, and the CPU 104 will be referred to as "image processing apparatus".

The image input unit 101 outputs image data acquired by reading a document image by the image reading unit 2 illustrated in FIG. 1 and externally-input image data to the image processing unit 102. The image processing unit 102 converts print information output from the image input unit 101 into intermediate information (hereinafter, referred to as "object") and stores the object in an object buffer of the storage unit 103. Further, the image processing unit 102 generates bitmap data based on the buffered object and stores the generated bitmap data in a buffer of the storage unit 103. At this time, the image processing unit 102 performs color conversion processing, image correction processing, and/or total toner amount control processing. Details thereof will be described below.

The storage unit 103 includes a read-only memory (ROM), a random access memory (RAM), and a hard disk (HD). The ROM stores various control programs and image processing programs to be run by the CPU 104.

The RAM is used as a reference area and a work area in which the CPU 104 stores data and various types of information. Further, the RAM and the HD are used to buffer the object and to store setting values for fixing temperatures described below. On the RAM and the HD, image data is accumulated, pages are sorted, a document of a plurality of sorted pages is accumulated, and a plurality of copies is printed. The image output unit 105 forms a color image on a recording medium such as a recording sheet in the image forming apparatus body 3 illustrated in FIG. 1 and outputs the recording medium with the color image formed thereon. An operation unit 106 receives user operations of issuing an instruction to set a print mode of the image processing unit 102 to the image forming apparatus 1.

Size and grammage information about a recording material (sheet) that is fed is transmitted from an acquisition unit 107 to the control unit 100.

Further, the temperature of the heating roller 351 is detected by the thermistor 352, and the detected information is transmitted to the control unit 100. The control unit 100 controls the halogen heater 390 to achieve a predetermined target temperature based on the detected temperature information.

<Productivity of Job with Mixed Grammages>

In recent years, it has been demanded that image forming apparatuses be productive in various cases. As bookbinding and printing are performed in many cases, high productivity is demanded in jobs with a mixture of recording materials with great and small grammages. The term "productivity" as used herein refers to the number of recording materials printed per unit time. Suitable fixing temperatures vary according to the magnitude of grammage, and higher fixing temperatures are suitable for greater grammages whereas lower fixing temperatures are suitable for smaller grammages. In a so-called mixture job in which sheets with great and small grammages are consecutively fed, a known technique is of changing the temperature to a suitable temperature for the grammage of the fed recording material each time a recording material with a different grammage is fed. To change the temperature, the image forming operation is interrupted, causing a downtime, which reduces the productivity in the mixture job. Preventing the decrease in productivity in a mixture job involves reducing changes of the fixing temperature. Thus, the fixing apparatus F according to the present embodiment is directed to preventing the decrease in productivity in a mixture job.

The fixing apparatus F according to the present embodiment reduces changes of the fixing temperature by controlling the amount of toner on a recording material based on the grammage of the recording material. Details thereof will be described. The term "fixing temperature" as used herein refers to a target temperature, and the surface temperature of the heating rotary member is controlled to be a predetermined temperature. According to the present embodiment, the heating rotary member is the belt 310. The present embodiment, however, is not limited to that described above, and the heating roller 351 can be used as the heating rotary member, controlling the surface temperature of the heating roller 351.

<Relationship Between Toner Amounts and Fixing Temperatures>

Next, a relationship between the amounts of toner on recording materials and the fixing temperatures will be described with reference to FIG. 4.

The term "amount of toner" herein refers to the amount of toner per unit area on an image that is expressed as a percentage. Specifically, when the maximum value of each of colors C, M, Y, and K is 100%, for example, the amount of toner on an area where two color toners of their maximum values are overlaid is defined as 200%. Each color has gradation and thus the amount of toner of each color can have a value of 0% to 100%.

The term "fixing temperature" refers to a temperature to fix a toner image on the recording material P to the recording material P. According to the present embodiment, the belt 310 directly applies heat to the recording material P. Thus, the halogen heater 390 is controlled to cause the surface temperature of the belt 310 to be the fixing temperature or higher.

A full-color mode is a mode in which four-color toners C, M, Y, and K can be used, and an intended color is reproduced in the range in which four-color toners can reproduce a color. According to the present embodiment, the amount of toner for approximately 240% is necessary and sufficient as the maximum amount of toner in printing in the full-color mode.

Under color removal (UCR) processing is the processing of replacing black or gray reproduced with three colors C, M, and Y with the single color K to reduce the scattering of toner forming characters and thin lines and to increase legibility of the characters in the full-color mode. In a UCR print mode, the maximum amount of toner is reduced by replacing C, M, and Y with K.

Figure 4:
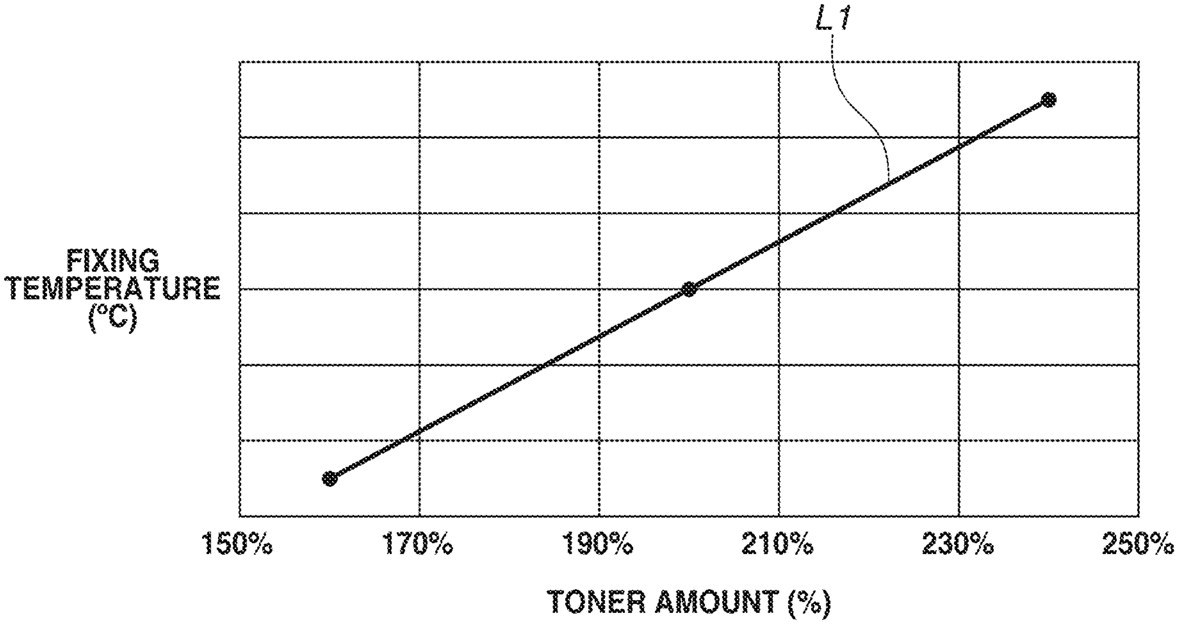
FIG. 4 illustrates a relationship between amounts of toner and fixing temperatures according to the first embodiment of the present disclosure.

FIG. 4 illustrate a relationship between amounts of toner and the fixing temperatures. Details thereof will be described. FIG. 4 illustrates fixing temperatures when the amount of toner is changed from the maximum in the full-color mode through the UCR processing or total toner amount control described below. If fixing is performed at a fixing temperature below a line L1 in FIG. 4, an insufficient amount of heat can be applied to the toner, causing an image defect.

As illustrated in FIG. 4, as the amount of amount increases, the amount of heat for melting and fixing the toner increases. Specifically, as the amount of toner increases, the fixing temperature rises. This means that the temperature of the belt 310 is to be set higher than the fixing temperature in performing fixing. That will cause the fixing temperature to be excessively high, a total toner amount control process described below is performed to control the amount of toner under a predetermined limit value.

<Total Toner Amount Control Process>

According to the present embodiment, the image processing unit 102 performs total toner amount control to control the maximum value of the amount of toner. The present embodiment especially has a feature that the toner maximum value is changed based on the operation mode and the sheet type. Thus, a detailed procedure of the process will be described in detail with reference to FIG. 5.

Figure 5:
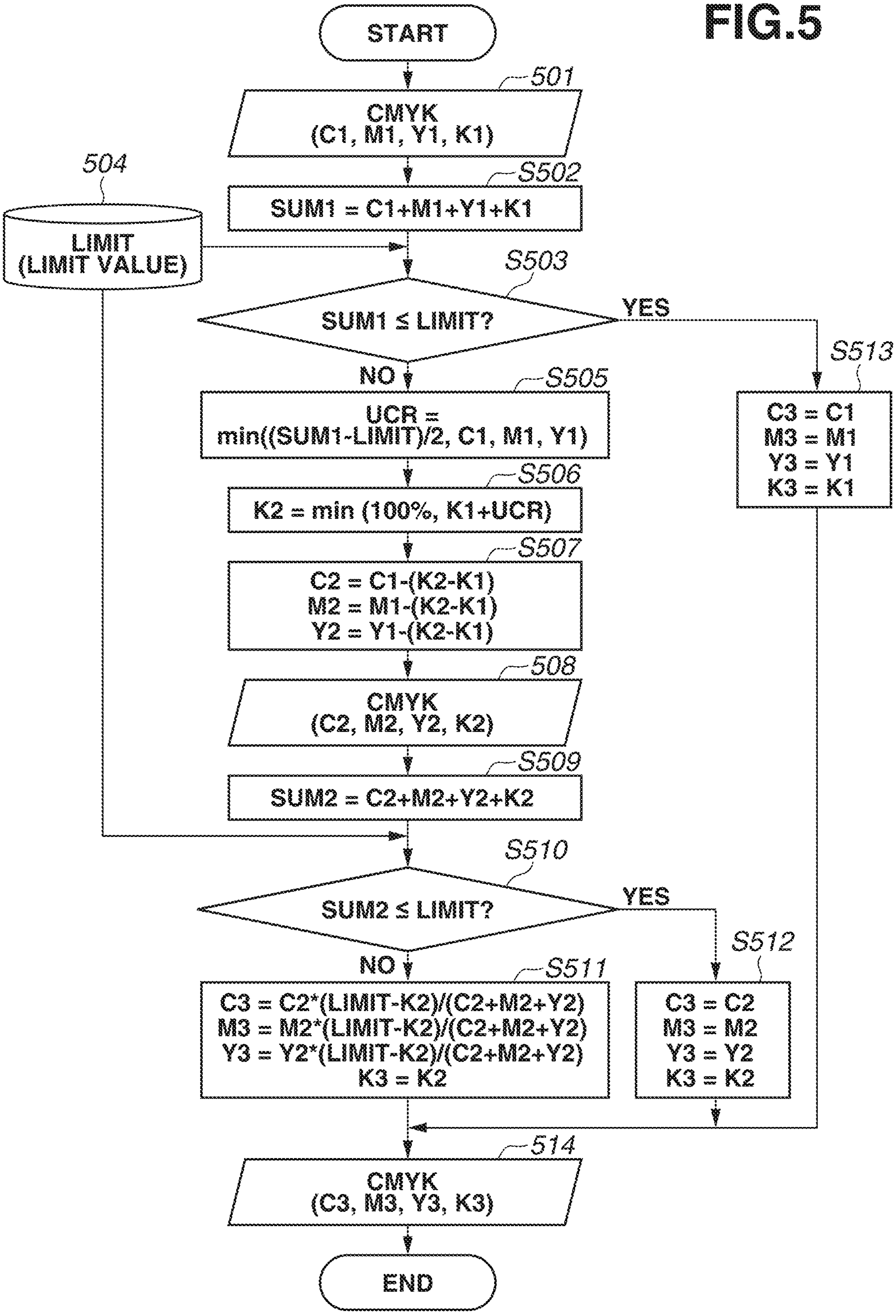
FIG. 5 is a flowchart illustrating a process of controlling a total amount of toner according to the first embodiment of the present disclosure.

The procedure of the process illustrated in FIG. 5 is performed with reference to all the colors C, M, Y, and K of an image that has undergone density correction in units of pixels. In FIG. 5, each block representing a piece of processing is given a reference numeral with the letter "S" whereas each block representing a piece of data is not given the letter "S" to discriminate between the blocks.

In step S502, the image processing unit 102 calculates a sum SUM1 of input CMYK (C1, M1, Y1, K1) 501. The CMYK (C1, M1, Y1, K1) 501 herein is data in one pixel units of a CMYK image.

In step S503, the image processing unit 102 reads LIMIT (limit value) 504 and compares the read LIMIT (limit value) 504 with the SUM1. The LIMIT (limit value) 504 herein refers to a limit value of the amount of toner that can be fixed, and corresponds to the maximum amount of toner. In the full-color mode described above, the LIMIT (limit value) 504 is defined as a numerical value such as "240%".

In step S503, if the SUM1 is less than or equal to the LIMIT (limit value) 504 (YES in step S503), the processing proceeds to step S513. In step S513, the image processing unit 102 outputs the CMYK (C1, M1, Y1, K1) 501 as CMYK (C3, M3, Y3, K3) 514. The CMYK (C3, M3, Y3, K3) 514 herein is data in one pixel units of the CMYK image that is an output of the total toner amount control process.

In step S503, if the SUM1 is greater than the LIMIT (limit value) 504 (NO in step S503), the processing proceeds to step S505. In step S505, the image processing unit 102 calculates a UCR value. The UCR value affects CMY toner reduction values and a K increase value and, according to the present embodiment, is calculated using the following formula (1).

$$UCR=\min((\mathrm{SUM1}-\mathrm{Limit})/2, C1, M1, Y1) \quad (1).$$

Formula (1) indicates that either a half of an amount by which the limit value is exceeded or the smallest one of the values of C1, M1, and Y1 is determined as the UCR value to minimize the toner amount reduction values.

In step S506, the image processing unit 102 calculates a value K2 from among the values of C2, M2, Y2, and K2 that are values after the first total toner amount limiting. A value obtained by adding the UCR value to K1 is basically used. A value over 100% cannot however be set for K2 alone, so that a value of 100% is set for K2 if the value exceeds 100%.

In step S507, the image processing unit 102 deletes the values of C1, M1, and Y1 and calculates values of C2, M2, and Y2. The difference between the value of K2 calculated in step S506 and the value of K1 herein is defined as a reduction value. Through the foregoing procedure of the process, CMYK (C2, M2, Y2, K2) 508 after the reduction of the toner maximum value is calculated.

In step S509, the image processing unit 102 calculates a SUM2 as a sum of C2, M2, Y2, and K2. In step S510, the image processing unit 102 reads the LIMIT (limit value) 504 and compares the read LIMIT (limit value) 504 with the SUM2. If the SUM2 is less than or equal to the LIMIT (limit value) 504 (YES in step S510), the processing proceeds to step S512. In step S512, the image processing unit 102 outputs the CMYK (C2, M2, Y2, K2) 508 as the CMYK (C3, M3, Y3, K3) 514. If the SUM2 is greater than the LIMIT (limit value) 504 (NO in step S510), the processing proceeds to step S511. In step S511, the image processing unit 102 sets the value of K2 as K3 as it is. Furthermore, the image processing unit 102 calculates a coefficient based on a value obtained by subtracting K2 from the LIMIT (limit value) 504 and the sum of C2, M2, and Y2. Then, the image processing unit 102 multiplies C2, M2, and Y2 by the calculated coefficient to obtain values C3, M3, and Y3 after the reduction of the amount of toner, and outputs the CMYK (C3, M3, Y3, K3) 514.

The foregoing process ensures that the sum of CMYK, i.e., the toner maximum value, is less than or equal to the maximum toner amount corresponding to the print mode.

<About Sheet Grammage and Toner Maximum Value>

Figure 6:
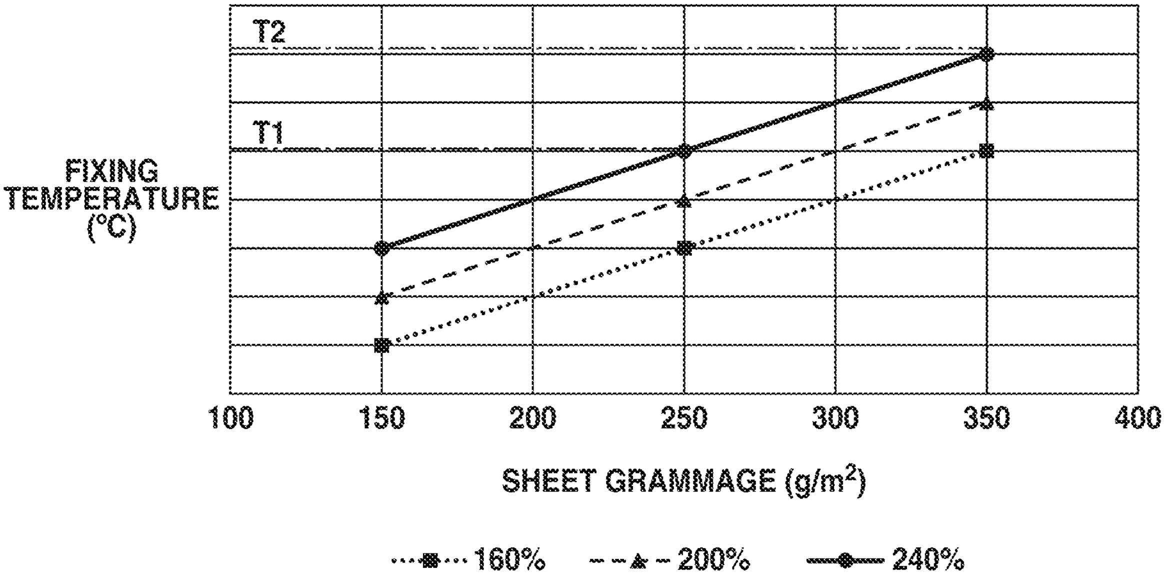
FIG. 6 illustrates relationships between sheet grammages and fixing temperatures according to the first embodiment of the present disclosure.

FIG. 6 illustrates a relationship between the sheet grammages and the fixing temperatures. Cases where the amount of toner is changed to 160%, 200%, and 240% are plotted. It is understood that higher fixing temperatures are reached for greater sheet grammages. This is because a sheet with a greater grammage takes away a greater amount of heat.

In FIG. 6, in a case where the fixing temperature is set at T1 and the grammage of the recording material is 250 g/m$^2$, up to the amount of toner for 240% can be fixed at the same fixing temperature. It is understood that the fixing temperature is to be increased to T2 to fix the amount of toner for 240% to a recording material with a grammage of 350 g/m$^2$. According to the present embodiment, T1 is, for example, 170° C., and T2 is, for example, 180° C. Changing the fixing temperature based on the grammage of the recording material as described above allows the toner to be reliably fixed, providing a high-quality image even with a greater amount of toner. Changing the fixing temperature, however, involves a wait time for the temperature change, taking a long time to output a great number of copies such as a booklet.

<Operations According to Present Exemplary Embodiment>

The image forming apparatus 1 according to the present embodiment can perform a plurality of modes including a productivity priority mode (first mode) in which the wait time for the change of the fixing temperature is short and an image quality priority mode (second mode) in which the image quality is prioritized in a mixture job. This offers selections of modes a user can choose based on an intended purpose. A procedure of determining the LIMIT (limit value) 504 of the toner maximum value based on the mode and the sheet type (sheet grammage) will be described with reference to FIG. 7.

In step S101, whether the productivity priority mode or the image quality priority mode is selected via the operation unit 106 is determined. If not the productivity priority mode but the image quality priority mode is selected (NO in step S101), the processing proceeds to step S102. In step S102, the control unit 100 determines the toner maximum value to be 240%. On the other hand, if the productivity priority mode is selected in step S101 (YES in step S101), the processing proceeds to step S103. In step S103, the control unit 100 determines whether the sheet grammage is greater than or equal to 250 g/m$^2$ based on the information from the acquisition unit 107. If the sheet grammage is less than 250 g/m$^2$ (NO in step S103), the processing proceeds to step S102. In step S102, the control unit 100 determines the toner maximum value to be 240%. In step S103, if it is determined that the sheet grammage is greater than or equal to 250 g/m$^2$ (YES in step S103), the processing proceeds to step S104. In step S104, the control unit 100 determines the toner maximum value to be 160%. The total toner amount control illustrated in FIG. 5 is performed based on the limit value of the determined toner maximum value.

Operations according to the present embodiment will now be described with reference to Table 1.

Figure 7:
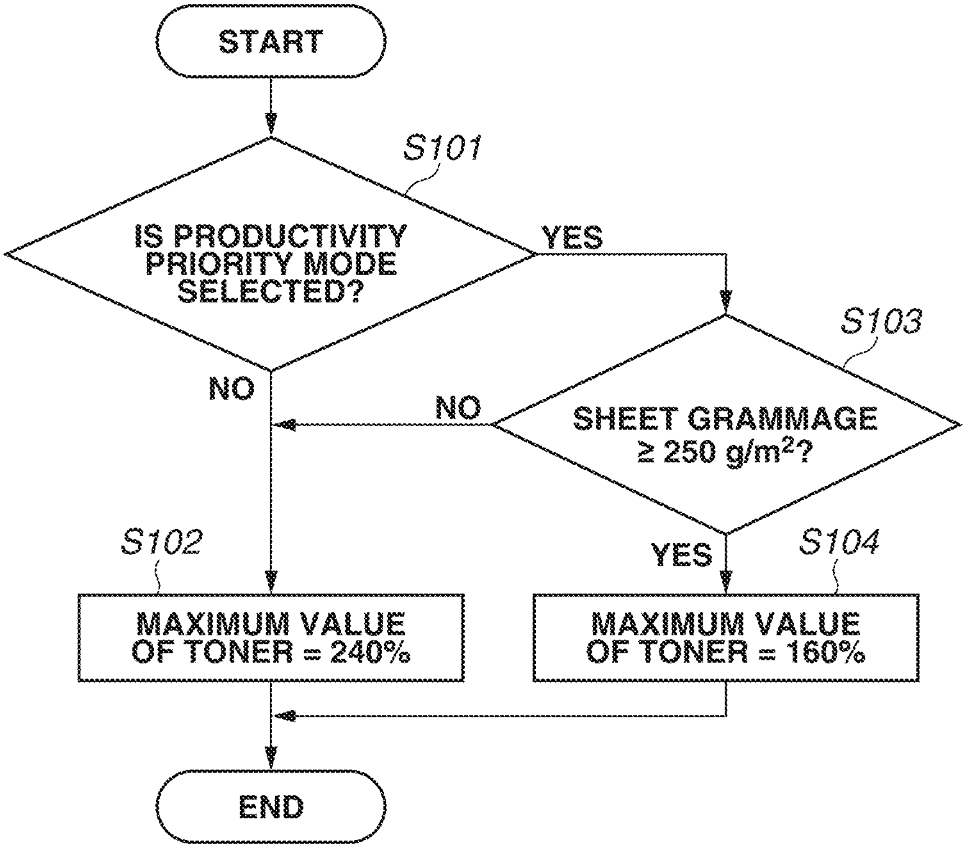
FIG. 7 is a flowchart illustrating a process of changing the amount of toner according to the first embodiment.

Table 1 shows setting values for the fixing temperature and the amount of toner in each mode for each sheet grammage based on the relationship between the fixing temperatures and the amounts of toner illustrated in FIG. 6 and the determination procedure in FIG. 7.

TABLE 1

| | Setting | Sheet Grammage (g/m$^2$) | | | | | | |
|---|---|---|---|---|---|---|---|---|
| Mode | Item | 100 | 150 | 200 | 250 | 300 | 350 | 400 |
| Productivity Priority Mode | Fixing Temperature | | | | T1 | | | T2 |
| | Toner Amount | | | 240% | | | 160% | |
| Image Quality Priority Mode | Fixing Temperature | | T1 | | | | T2 | |
| | Toner Amount | | | | 240% | | | |

When the productivity priority mode is selected and a fixing target is a sheet with a grammage of 100 g/m$^2$ or greater and less than 300 g/m$^2$, the maximum value for the amount of toner on the sheet is set at 240%. On the contrary, when a fixing target is a sheet with a grammage of 300 g/m$^2$ or greater, the maximum value for the amount of toner on the sheet is set at 160%.

A grammage of 100 g/m$^2$ or greater and less than 300 g/m$^2$ will be referred to as "first grammage", whereas a grammage of 300 g/m$^2$ or greater and less than 400 g/m$^2$ will be referred to as "second grammage". In a mixture job with a mixture of a sheet with the first grammage and a sheet with the second grammage, the fixing is performed in the productivity priority mode. The maximum value for the amount of toner on the sheet with the first grammage is set at 240%, whereas the maximum value for the amount of toner on the sheet with the second grammage is set at 160%. This makes it possible to fix the sheet with the first grammage and the sheet with the second grammage at the same temperature T1 (170° C. according to the present embodiment). Thus, the image forming is performed without changing the fixing temperature even when the sheet with the second grammage comes after the sheet with the first grammage. This prevents a decrease in productivity in a mixture job.

Further, a grammage of 400 g/m$^2$ or greater will be referred to as "third grammage", and according to the present embodiment, if a sheet with the third grammage is a fixing target, the maximum value for the amount of toner on the sheet is set at 160%. Further, the fixing temperature is set at T2 (180° C. according to the present embodiment) higher than T1 because of the great grammage. Thus, the fixing temperature is to be changed if a sheet with the third grammage comes after the sheet with the first or second grammage in a job with a mixture of a sheet with the first or second grammage and the sheet with the third grammage. This enables fixing to a sheet with a significantly great grammage such as 400 g/m$^2$.

In the image quality priority mode, the grammage range in which the fixing can be performed without the wait time for a temperature change is 100 g/m$^2$ or greater and less than 300 g/m$^2$, the range of which is smaller than that in the productivity priority mode. Meanwhile, the maximum value for the amount of toner on the sheet is equally set at 240% regardless of grammage. By not reducing the maximum value for the amount of toner with a greater sheet grammage, high image quality is provided. Further, the fixing temperature when a fixing target is a sheet with a grammage (first grammage) of 100 g/m$^2$ or greater and less than 300 g/m$^2$ is set at T1, whereas the fixing temperature when a fixing target is a sheet with a grammage of 300 g/m$^2$ or greater including the second and third grammages is set at T2. The maximum value for the amount of toner is equally set, and a higher fixing temperature is set for a sheet with a greater grammage. This makes it possible to provide high-quality images. While the maximum value for the amount of toner in the image quality priority mode is set at 240% according to the present embodiment, the present embodiment is not limited to that described above. The maximum value for the amount of toner in the image quality priority mode can be a value that is greater than the maximum value for the amount of toner for the second grammage in the productivity priority mode. This increases the image quality in the image quality priority mode compared to the productivity priority mode.

In the productivity priority mode, the fixing temperature is determined based on whether the sheet grammage is greater than or equal to, or less than 400 g/m$^2$. In the image quality priority mode, the fixing temperature is determined based on whether the sheet grammage is greater than or equal to, or less than 300 g/m$^2$. Specifically, a threshold value of the sheet grammage for changing the fixing temperature is greater in the productivity priority mode than in the image quality priority mode. This increases the sheet grammage range in which the fixing can be performed at the same fixing temperature in the productivity priority mode, preventing a decrease in productivity due to a temperature change.

As described above, in the productivity priority mode, the maximum value for the amount of toner is controlled to decrease with greater sheet grammages. This increases the sheet grammage range in which the fixing can be performed at the same temperature. This improves the productivity in a mixture job with a mixture of sheets with a different grammage from one another.

In the image quality priority mode, the maximum value for the amount of toner is equally set regardless of the sheet to prioritize image quality. This makes it possible to provide high image quality although the fixing temperature in a mixture job is to be changed in more cases.

As described above, a user selects the productivity priority mode or the image quality priority mode, whereby the limit value of the toner maximum value is appropriately determined, reducing fixing defects and providing prints over a wide sheet grammage range with a reduced wait time.

The regulation temperature T1 in the productivity priority mode according to the present embodiment does not have to be a single fixed temperature. Specifically, the regulation temperature T1 can vary in a range of about ±5° C. as long as the wait time for a regulation temperature change does not become excessively long.

Table 1 is an example of fixing to plain paper. The present embodiment is also applicable to different sheet types other than plain paper. For example, the present embodiment is also applicable to cases of fixing coated sheets. With a coated sheet, a grammage range in which the fixing can be performed at the same temperature decreases.

According to the present embodiment, a conveyance speed at which a sheet passes through the nip portion is constant in the productivity priority mode regardless of sheet grammage. As a greater amount of heat is applied to a sheet with a greater grammage, a sheet with a great grammage can be conveyed at a reduced conveyance speed to increase the amount of heat applied to the sheet. According to the present embodiment, however, with a constant conveyance speed regardless of the sheet grammage, the maximum value for the toner is changed, whereby the fixing is performed without decreasing the conveyance speed. This prevents a decrease in productivity.

A second embodiment will be described. A sheet with a smaller grammage has a lower stiffness. In this case, the sheet can adhere to the fixing belt 310 due to adhesion of molten toner with a great total amount of toner (hereinafter, referred to as "separation failure"). According to the second embodiment, a procedure of determining a toner amount limit is applied to the small sheet grammage side to prevent separation failure.

The procedure according to the present embodiment is partly different in the procedure of determining the total amount of toner in FIG. 7 and the operations in Table 1 that are associated with the procedure in FIG. 7 according to the first embodiment. Like numbers refer to like items, and redundant descriptions thereof will be omitted.

A procedure of determining the limit value of the toner maximum value according to the present embodiment will be described with reference to FIG. 8. Instead of the determination in step S103 in the procedure in FIG. 7, the control unit 100 determines whether the sheet grammage is smaller than or equal to 75 g/m$^2$ based on the information from the acquisition unit 107. If the sheet grammage is greater than 75 g/m$^2$ (NO in step S103), the processing proceeds to step S102. In step S102, the control unit 100 determines the toner maximum value to be 240%. If the sheet grammage is smaller than or equal to 75 g/m$^2$ (YES in step S101), the processing proceeds to step S104. In step S104, the control unit 100 determines the toner maximum value to be 160%. The total toner amount control process illustrated in FIG. 5 is performed based on the determined limit value of the toner maximum value.

Operations according to the present embodiment will now be described below with reference to Table 2.

Figure 8:
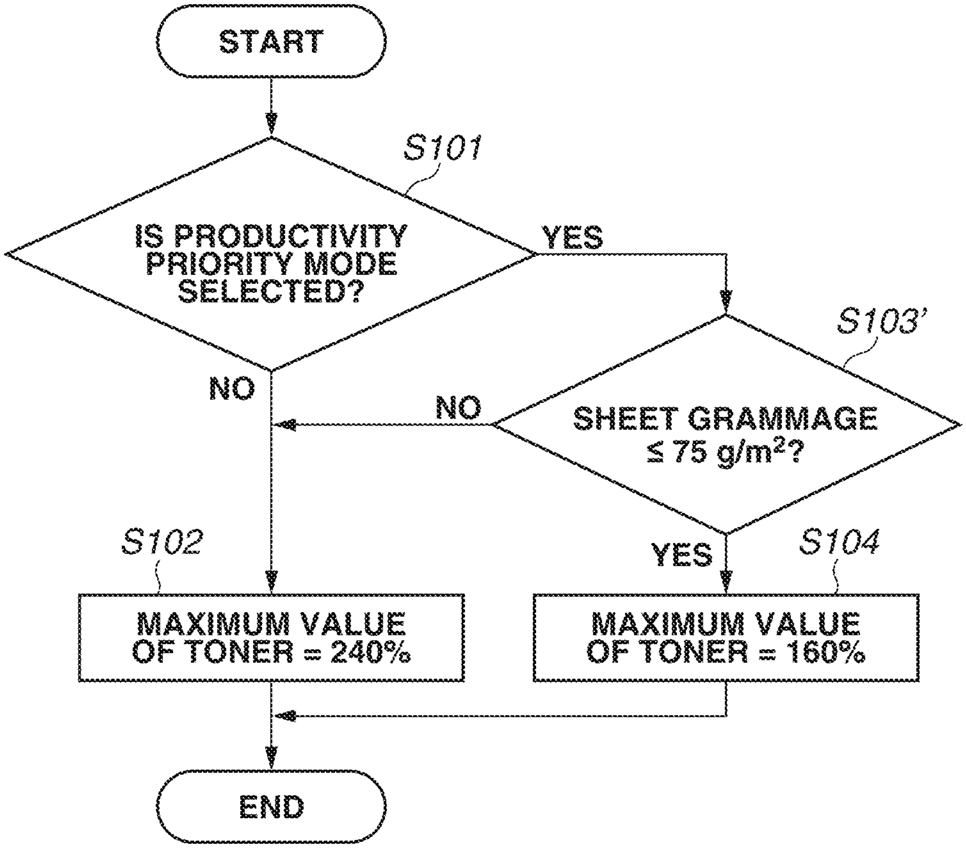
FIG. 8 is a flowchart illustrating a process of changing the amount of toner according to a second embodiment.

Table 2 shows setting values of the fixing temperature and the amount of toner in each mode for each sheet grammage based on the determination procedure in FIG. 8.

TABLE 2

| Mode | Setting Item | Sheet Grammage (g/m$^2$) 50 | 75 | 100 | 125 | 150 | 175 | 200 |
|---|---|---|---|---|---|---|---|---|
| Productivity Priority Mode | Fixing Temperature | T0 | | T1 | | | | |
| | Toner Amount | 160% | | 240% | | | | |
| Image Quality Priority Mode | Fixing Temperature | T0 | | T1 | | | | |
| | Toner Amount | 240% | | | | | | |

When the productivity priority mode is selected and a fixing target is a sheet with a grammage of 50 g/m$^2$ or greater and less than 100 g/m$^2$, the toner maximum value is decreased to 160%. This makes it possible to perform fixing without the wait time for a regulation temperature change even in a job including a wide range of sheet types from 100 g/m$^2$ to 200 g/m$^2$ while preventing the separation failure and fixing defects.

Further, in the image quality priority mode, the grammage range in which the fixing can be performed without the wait time for a regulation temperature change is reduced to the range of 100 g/m$^2$ to 200 g/m$^2$. However, a toner maximum value of 240% can be fixed, providing high-quality images.

As described above, a user selects the productivity priority mode or the image quality priority mode, whereby the limit value of the toner maximum value is appropriately determined, providing prints over a wide sheet grammage range without the wait time while preventing the separation failure.

A third embodiment will be described. In the above-described example according to the first embodiment, when the productivity priority mode is selected and a fixing target is a sheet with the second grammage, the maximum value for the amount of toner is set at 160%, whereas when the productivity priority mode is selected and a fixing target is a sheet with the first grammage, the maximum value for the amount of toner is set at 240%. This makes it possible to fix the sheet with the first grammage and the sheet with the second grammage at the same regulation temperature, thereby preventing a decrease in productivity. In an example described below according to the third embodiment, the difference in fixing temperature between a sheet with the first grammage and a sheet with the second grammage is smaller in the productivity priority mode than in the image quality priority mode. This improves the productivity in the productivity priority mode compared to the image quality priority mode.

TABLE 3

| Mode | Setting Item | Sheet Grammage (g/m$^2$) 100 | 150 | 200 | 250 | 300 | 350 | 400 |
|---|---|---|---|---|---|---|---|---|
| Productivity Priority Mode | Fixing Temperature | T1 | | | | T4 | | T2 |
| | Toner Amount | 240% | | | | 160% | | |
| Image Quality Priority Mode | Fixing Temperature | T1 | | | | | T2 | |
| | Toner Amount | 240% | | | | | | |

As shown in Table 3, the fixing temperature for a sheet with the second grammage is set at T4 (175° C.). Thus, the difference in fixing temperature between the first and second grammages is less in the productivity priority mode than in the image quality priority mode.

The reduced difference in fixing temperature reduces the time to change the fixing temperature. This prevents a decrease in productivity.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Applications No. 2022-045079, filed Mar. 22, 2022, and No. 2022-080694, filed May 17, 2022, which are hereby incorporated by reference herein in their entirety.

What is claimed is:

1. An image forming apparatus comprising:

a heating rotary member configured to apply heat to a recording material;

a pressing rotary member configured to press the heating rotary member, the pressing rotary member and the heating rotary member forming a nip portion, at which heat and pressure is applied to the recording material, and a toner image is fixed to the recording material;

a control unit configured to control a maximum value for an amount of toner on the recording material; and an acquisition unit configured to acquire grammage information of the recording material that is a target of the fixing, wherein a mixture job is a job with a mixture of a plurality of recording materials including recording material with a first grammage and recording material with a second grammage greater than the first grammage, wherein one of a plurality of modes including a first mode and a second mode is performable in the mixture job, wherein in a case where the mixture job is to be performed in the first mode, the maximum value on the recording material with the second grammage is smaller than the maximum value on the recording material with the first grammage, and a fixing temperature for the recording material with the first grammage is equal to a fixing temperature for the recording material with the second grammage, wherein in a case where the mixture job is to be performed in the second mode, the maximum value on the recording material with the first grammage is equal to the maximum value on the recording material with the second grammage, and the fixing temperature for the recording material with the first grammage is lower than the fixing temperature for the recording material with the second grammage, and wherein the maximum value on the recording material with the second grammage is greater in the second mode than in the first mode.

2. The image forming apparatus according to claim 1, wherein a grammage greater than the second grammage is set as a third grammage, and wherein in the first mode, a fixing temperature for the heating rotary member is greater in fixing a recording material with the third grammage than in fixing the recording material with the second grammage.

3. The image forming apparatus according to claim 2, wherein in the first mode, a speed at which the recording material with the third grammage passes through the nip portion is equal to a speed at which the recording material with the first grammage passes through the nip portion.

4. The image forming apparatus according to claim 1, wherein in the first mode, a speed at which the recording material with the first grammage passes through the nip portion is equal to a speed at which the recording material with the second grammage passes through the nip portion.

5. The image forming apparatus according to claim 1, wherein in a job with a mixture including recording material with different grammages, a threshold value of a grammage for changing a temperature for the heating rotary member is smaller in the second mode than in the first mode.

6. The image forming apparatus according to claim 1, further comprising an operation unit configured to receive a user operation, wherein the operation unit receives one of the plurality of modes, and wherein the image forming apparatus performs the mode received by the operation unit.

7. An image forming apparatus comprising:

a heating rotary member configured to apply heat to a recording material;

a pressing rotary member configured to press the heating rotary member, the pressing rotary member and the heating rotary member forming a nip portion, at which heat and pressure is applied to the recording material, and a toner image is fixed to the recording material;

a control unit configured to control a maximum value for an amount of toner on the recording material; and an acquisition unit configured to acquire grammage information of the recording material that is a target of the fixing, wherein a mixture job is a job with a mixture of a plurality of recording materials including recording material with a first grammage and recording material with a second grammage greater than the first grammage, wherein one of a plurality of modes including a first mode and a second mode is performable in the mixture job, wherein in a case where the mixture job is to be performed in the first mode, the maximum value on the recording material with the second grammage is smaller than the maximum value on the recording material with the first grammage, wherein in a case where the mixture job is to be performed in the second mode, the maximum value on the recording material with the first grammage is equal to the maximum value on the recording material with the second grammage, wherein the maximum value on the recording material with the second grammage is greater in the second mode than in the first mode, and wherein a difference in fixing temperature between the first grammage and the second grammage is greater in the second mode than in the first mode.

8. The image forming apparatus according to claim 7, wherein a grammage greater than the second grammage is set as a third grammage, and wherein in the first mode, a fixing temperature for the heating rotary member is greater in fixing a recording material with the third grammage than in fixing the recording material with the second grammage.

9. The image forming apparatus according to claim 8, wherein in the first mode, a speed at which the recording material with the third grammage passes through the nip portion is equal to a speed at which the recording material with the first grammage passes through the nip portion.

10. The image forming apparatus according to claim 7, wherein in the first mode, a speed at which the recording material with the first grammage passes through the nip portion is equal to a speed at which the recording material with the second grammage passes through the nip portion.

11. The image forming apparatus according to claim 7, wherein in a job with a mixture including recording material with different grammages, a threshold value of a grammage for changing a temperature for the heating rotary member is smaller in the second mode than in the first mode.

12. The image forming apparatus according to claim 7, further comprising an operation unit configured to receive a user operation, wherein the operation unit receives one of the plurality of modes, and wherein the image forming apparatus performs the mode received by the operation unit.

13. An image forming apparatus comprising:

a heating rotary member configured to apply heat to a recording material;

a pressing rotary member configured to press the heating rotary member, the pressing rotary member and the heating rotary member forming a nip portion, at which heat and pressure is applied to the recording material, and a toner image is fixed to the recording material;

a control unit configured to control a maximum value for an amount of toner on the recording material; and an acquisition unit configured to acquire grammage information of the recording material that is a target of the fixing, wherein a mixture job is a job with a mixture of a plurality of recording materials including recording material with a first grammage and recording material with a second grammage greater than the first grammage, wherein one of a plurality of modes including a first mode and a second mode is performable in the mixture job, wherein in a case where the plurality of recording materials is a target of the fixing in the mixture job, the maximum value on the recording material with the first grammage is smaller than the maximum value on the recording material with the second grammage in the first mode, whereas the maximum value on the recording material with the first grammage is equal to the maximum value on the recording material with the second grammage in the second mode.

* * * * *